United States Patent [19]
Pasek

[11] Patent Number: 5,417,143
[45] Date of Patent: May 23, 1995

[54] LOCK-OUT MECHANISM FOR EMPTY/LOAD CHANGEOVER VALVE

[75] Inventor: Stanley J. Pasek, Brantford, Canada

[73] Assignee: Westinghouse Air Brake Company, Wilmerding, Pa.

[21] Appl. No.: 205,232

[22] Filed: Mar. 3, 1994

[51] Int. Cl.[6] .................. F15B 15/26; B60T 11/10
[52] U.S. Cl. .................... 92/20; 188/151 A; 188/353
[58] Field of Search ............. 188/265, 353, 365, 216, 188/151 A; 303/89; 92/15, 20

[56] References Cited

U.S. PATENT DOCUMENTS

| | | | |
|---|---|---|---|
| 1,006,239 | 10/1911 | Leftwich et al. | 303/89 |
| 1,668,877 | 5/1928 | Stroup | 303/89 |
| 1,911,634 | 5/1933 | Madden | 188/151 A |
| 2,964,141 | 12/1960 | Schlumbrecht | 188/265 X |
| 3,365,036 | 1/1968 | Forrester | 188/265 X |
| 4,007,815 | 2/1977 | Acre | 188/265 |
| 4,116,113 | 9/1978 | Leclerc | 188/265 X |
| 4,887,944 | 12/1989 | Worby et al. | 92/15 X |

Primary Examiner—John E. Ryznic
Attorney, Agent, or Firm—Gary J. Falce

[57] ABSTRACT

A lock-out assembly having a latching mechanism by which means a plunger may be manually depressed and latched in a lock-out position in which a lock pin is pre-set by engagement with an actuator rod of an empty/load valve or the like, so that in response to axial extension of the actuator rod sufficient to align a locking groove in the actuator rod with the lock pin, locking engagement therebetween will occur to limit further axial extension of the actuator rod, without any further action on the part of the operator. Automatic disengagement of the lock pin from the locking groove of the actuator rod occurs in response to axial retraction of the actuator rod, by effecting disengagement of the latching mechanism to allow a return spring to reset the plunger.

18 Claims, 4 Drawing Sheets

LOCK-OUT MECHANISM FOR EMPTY/LOAD CHANGEOVER VALVE

BACKGROUND OF THE INVENTION

The present invention relates to lock-out mechanisms for limiting the stroke of actuators or the like and particularly to such a lock-out mechanism as may be employed with railroad type empty/load control valves.

In the railroad industry, empty/load control valves are typically employed on freight cars having high gross to tare weight ratios, the purpose being to automatically reduce the car brake pressure under "empty" car load conditions, in order to prevent the occasion of wheel slide due to excessive brake force, particularly under heavy service and emergency braking.

The "empty" or "load" condition of a freight car is typically determined by sensing the car spring deflection, which indirectly reflects the weight of car lading, or by sensing the pressure of lading on a slope sheet on hopper type cars, which directly reflects the weight of the car load. Spring deflection may be detected by means of a car-body-mounted empty/load valve having a sensing arm adapted to engage the car truck during a brake application. Alternatively, the empty/load valve may be truck-mounted with the sensing arm arranged to engage the car body. Slope sheet pressure may be detected by a sensing rod that contacts a deflectable membrane forming part of the slope sheet. The sensing rod measures the deflection of the membrane in accordance with the weight of the car lading and accordingly positions a spool within the empty/load valve that is mounted on the slope sheet generally in concentric relationship with the deflectable membrane.

Under certain conditions, it is desirable to disable the empty/load valve in order to prevent an "empty" car load condition from being detected, such as in carrying out brake tests and/or when setting up a slack adjuster, the desideratum being to achieve normal brake pressure.

Where empty/load valves are employed in a manner to detect spring deflection indicative of the car weight, the empty/load valve is typically disabled by strategically locating a block of wood or the like, between the sensing arm and car body or truck, as the case may be, so as to cause a false reading by the sensing arm.

Where empty/load valves are utilized in slope sheet configurations, a plug is generally removed from an access hole in the empty/load valve to accommodate insertion of various devices for jamming the sensing rod to thereby lockup the valve in its "load" setting.

Such disabling methods are not only laborious and time consuming, but there is no guarantee that the operator/tester conducting the brake test or slack adjuster set-up will remember to restore the disabled valve to its operative condition. Such an oversight, of course, can have serious consequences, since full "load" brake pressure would then be available for braking an "empty" weight car, resulting in the likelihood of wheel damage due to sliding wheels.

SUMMARY OF THE INVENTION

It is the object of the present invention, therefore, to provide a simple, yet reliable lock-out mechanism for such actuators as empty/load valves or the like;

It is an extension of the foregoing objective to provide a lock-out mechanism that can be pre-set by an operator/tester to disable an empty/load valve or the like upon subsequently effecting operation thereof;

It is another extension of the foregoing objective to provide a lock-out mechanism that automatically resets, in order to ensure restoration of the empty/load valve or the like to a proper operating condition.

In accordance with these objectives, there is provided a lock-out assembly for limiting axial extension of an actuator rod from a retracted position comprising a manually operable plunger having a reset position and a lock-out position, a lock pin connected to the plunger with relative axial movement therebetween, the locking pin projecting a predetermined distance from one end of the plunger when relative axial movement therebetween is taken up, detent means for latching the plunger in its lock-out position in which the distance between the periphery of the actuator rod and the one end of the plunger is less than the predetermined distance the lock pin projects from the plunger, such that the lock pin is pre-set under compression for subsequent engagement with stop means associated with the actuator rod when the actuator rod is extended from its retracted position, the detent means being automatically released in response to subsequent movement of the actuator rod back toward its retracted position to unlatch the plunger and effect forced return to its reset position, whereby the locking pin through its connection with the plunger is withdrawn from locking engagement with the actuator rod.

BRIEF DESCRIPTION OF THE DRAWINGS

These and other objects and attendant advantages of the invention will become apparent from the following explanation of the invention when considered in conjunction with the accompanying drawings in which.

DESCRIPTION AND OPERATION

Figure 1:
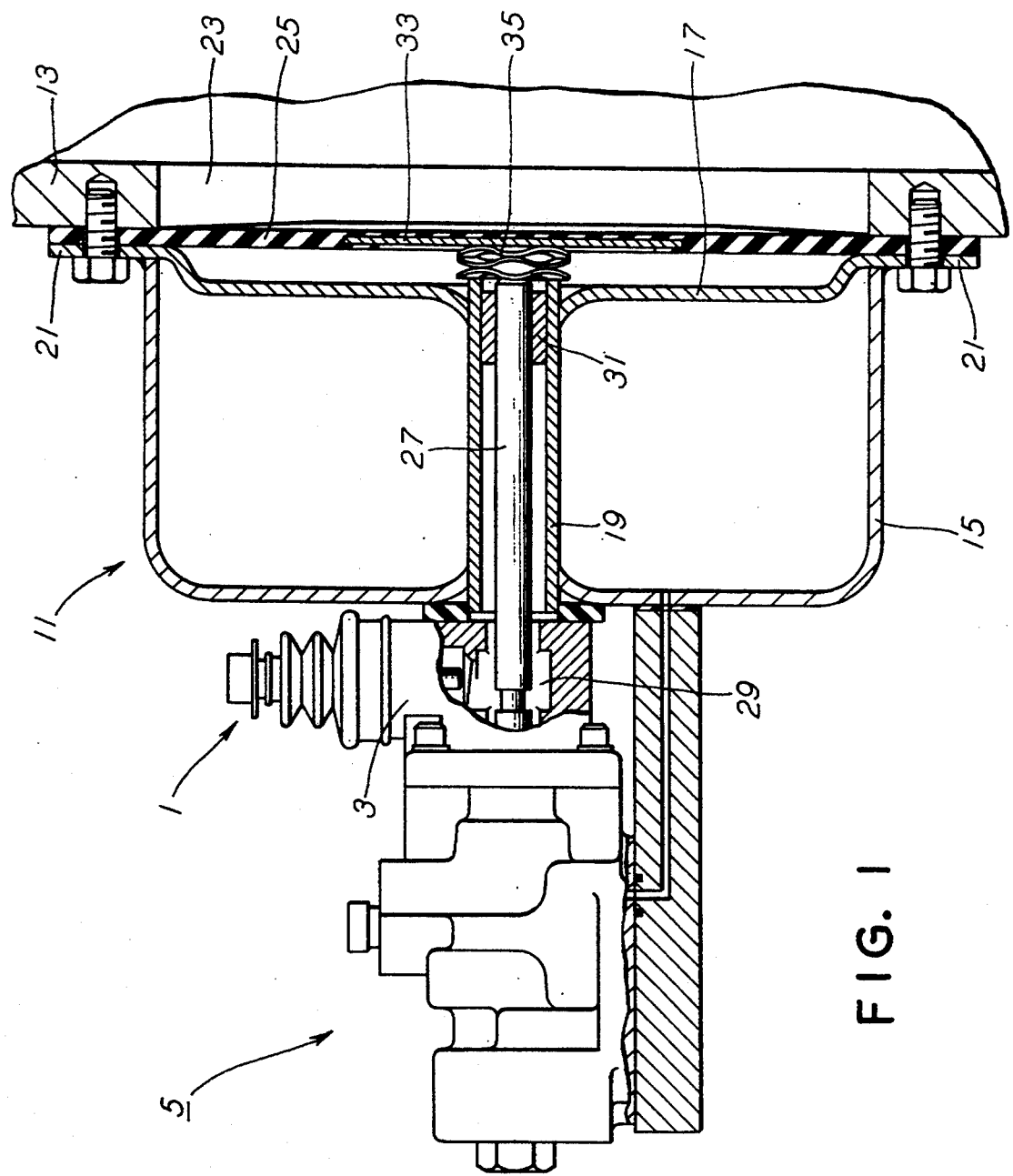
FIG. 1 is an assembly view partially in outline and partially in section showing an empty/load brake control valve, with which the lock-out assembly of the present invention is incorporated, mounted to a slope sheet of a railroad hopper car.

Referring to FIG. 1 of the drawings, a lock-out assembly 1 comprising the present invention is shown housed in the cover 3 of an empty/load type valve device 5. Such an empty/load valve device is known from U.S. Pat. Nos. 5,005,915; 5,100,207; and 5,106,168, which are incorporated herein by reference. Whereas applicants empty/load valve device embodying lock-out assembly 1 is arranged to sense the weight of freight car lading by deflection of a slope sheet membrane, as will be hereinafter explained, the aforementioned Patents employ a sensing arm to detect car spring deflection and thus car weight. It will be understood however, that the basic empty/load valve device operates essentially the same in either case, the only difference being in how the car load condition is detected.

In sensing the load weight acting on a hopper car slope sheet 13, empty/load valve device 5 is connected, as by bolts (not shown) to a volume reservoir 11, which is in turn connected to the car slope sheet 13. Reservoir 11 comprises a cup-shaped body 15 and a base plate 17, each having a central aperature into which is placed a sleeve member 19. Reservoir 11 is secured to slope sheet 13 by bolting the rim 21 of base plate 17 around an opening 23 provided in the slope sheet. This opening 23 is covered by an elastomeric diaphragm member 25 that is clamped between base plate 17 and slope sheet 13.

An actuator rod 27 of empty/load valve device 5 passes through a locking chamber 29 of lock-out mechanism 5 formed in cover 3, extends into sleeve 19, and through a guide bushing 31 in sleeve 19, the projecting end of rod 27 being adapted to engage a metal insert 33 that reinforces diaphragm 25.

It will be appreciated that as the weight of the commodity carried by the hopper car increases, so does the degree of deflection of diaphragm member 25. This in turn determines the maximum distance that actuator rod 27 is capable of extending to thereby establish the load setting that the empty/load valve device 5 assumes when activated in response to a brake application, as will hereinafter be explained.

A relatively light spring 35, such as a wave spring or Belleville spring is arranged between metal insert 33 of diaphragm member 25 and either the end of sleeve 19, as shown, or alternatively base plate 17, the purpose being to maintain diaphragm member 25 in engagement with the commodity at the slope sheet opening, particularly during cold temperatures when the diaphragm elastomer tends to stiffen.

Figure 2:
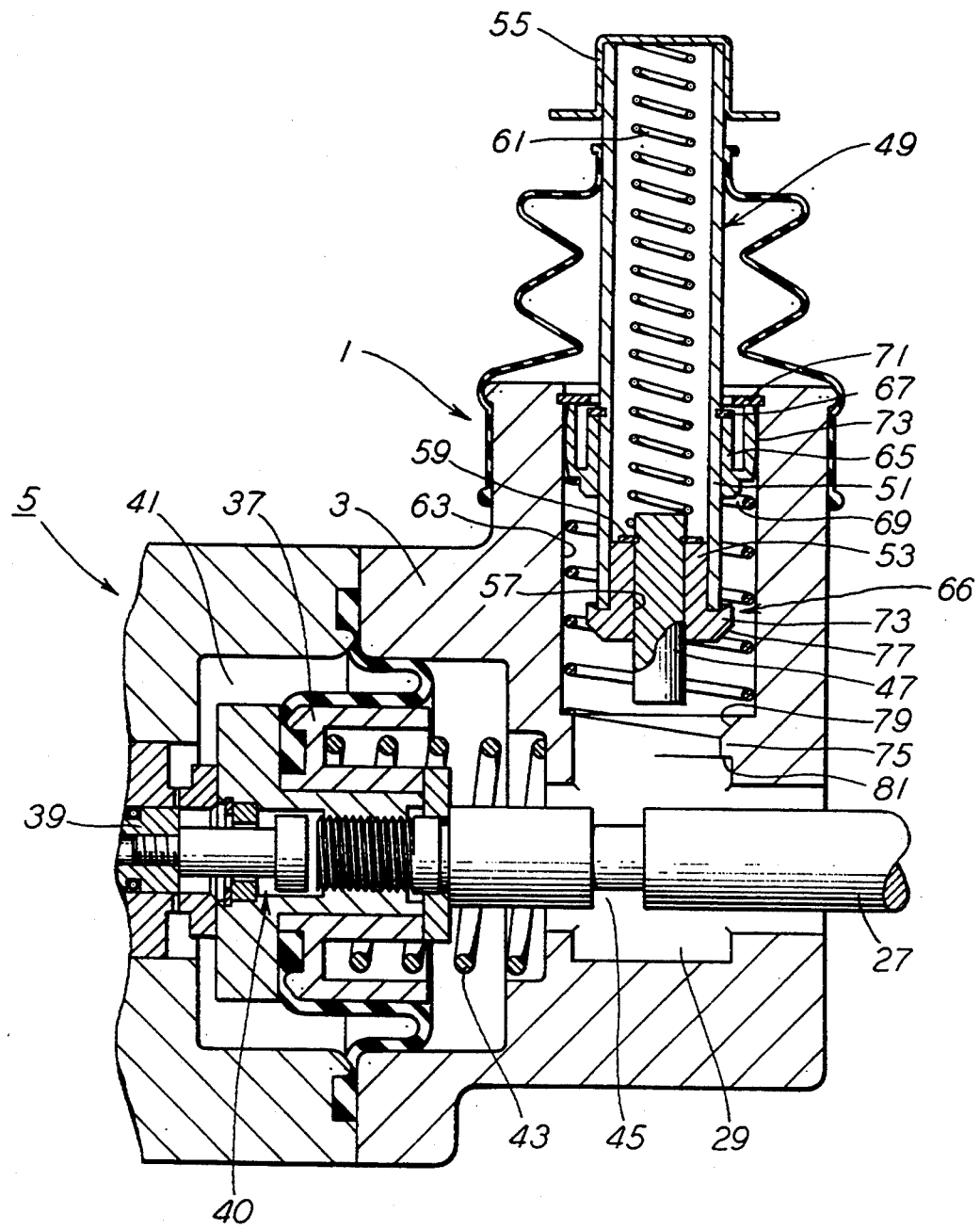
FIG. 2 is an enlarged sectional view of the lock-out assembly of FIG. 1 shown in its normal reset position.
Figure 3:
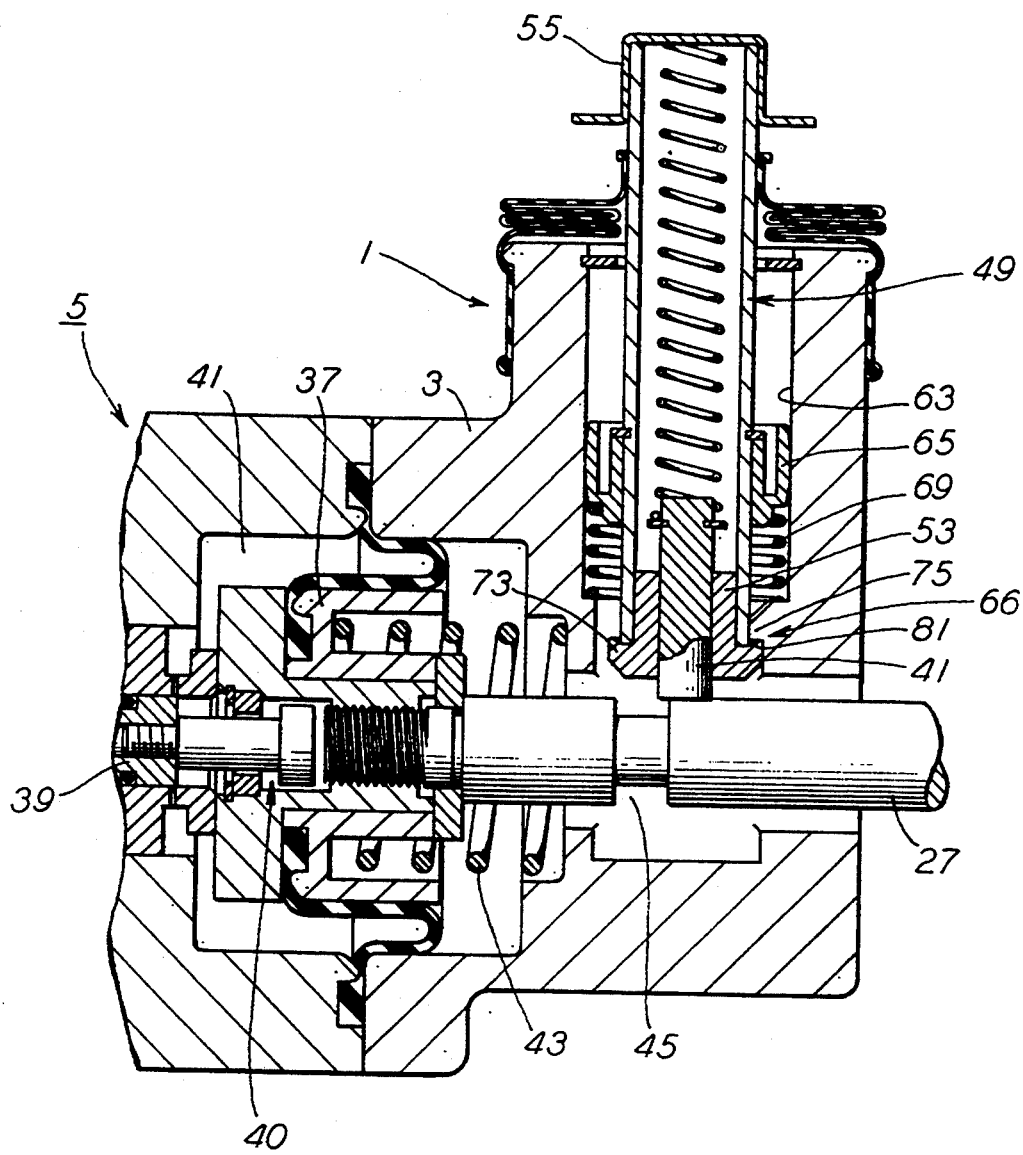
FIG. 3 is an enlarged sectional view of the lock-out assembly of FIG. 1 shown in its pre-set position.
Figure 4:
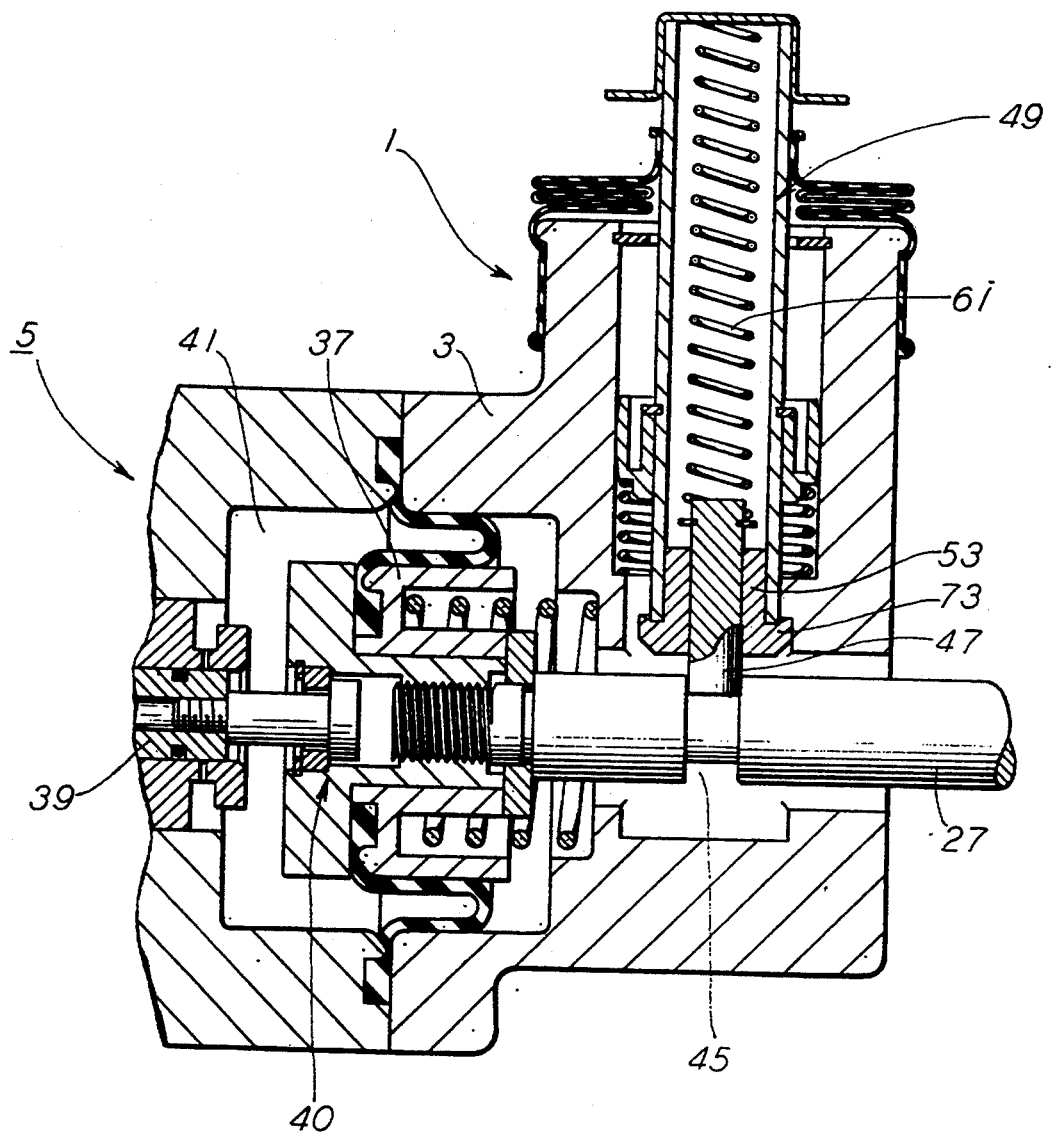
FIG. 4 is an enlarged sectional view of the lock-out assembly of FIG. 1 shown in its lock-out position.

As shown in FIGS. 2, 3 and 4, actuator rod 27 is screw-threaded to the empty/load valve actuator piston 37, which in turn positions a spool valve 39 through a lost-motion connection 40 to effect either load or empty brake control. Until the brake pressure effective in an actuating chamber 41 formed on the left-hand side of piston 37 develops sufficient force to overcome the force of a spring 43 acting on the opposite side, piston 37 is maintained in its release position, as shown in FIG. 2. Accordingly, actuator rod 27 is maintained in its leftward-most release position in which the end thereof is spaced-apart from diaphragm member 25 regardless of the car load condition. In this position, an annular recess 45 in actuating rod 27 is located on the left-hand side of a lock pin 47 of lock-out assembly 1 comprising the present invention.

When actuating rod 27 is shifted rightwardly out of release position by actuator piston 37, the end of rod 27 engages the metal insert 33 of diaphragm member 33, which limits the axial distance actuating rod 27 is extended, in accordance with the weight of the commodity carried by the hopper car and acting on slope sheet 13 at opening 23 therein. Accordingly, piston 37 through its lost-motion connection 40 engages and shifts spool valve 39 in a rightward direction to either a load setting or an empty setting, as determined by the extended position of actuating rod 27. In this manner, the annular recess 45 in actuating rod 27 may be shifted axially through a range of travel extending from its leftward-most position on the left hand side of lock pin 47, as shown in FIGS. 1 and 2, corresponding to release position, to a position on the right hand side of lock pin 47 corresponding to the empty setting of spool valve 39. The load setting of spool valve 39 corresponds to a position of actuator rod 27 in which annular recess 45 lies between its leftward-most location and a location on the left-hand side of lock pin 47, as viewed in the drawings.

Lock-out assembly 1 includes, in addition to lock pin 47, a plunger 49 comprising a cylindrical sleeve 51 having an end plug 53 that closes sleeve 51 at one end and a push button cap 55 that encloses sleeve 51 at its opposite end which projects from body 3. End plug 53 is provided with a bore 57 in which lock pin 47 is reciprocably disposed. A retaining ring 59 on lock pin 47 supports one end of a spring 61 that is captured within sleeve 51 by engagement with push button cap 55 at its other end. Retaining ring 59 is adapted to engage end plug 53 in a caged position of spring 61, in which position the active end of lock pin 47 projects a predetermined distance from end plug 53 toward abutment with actuating rod 27.

Plunger 49 is pivotally supported in a bore 63 in empty/load valve body 3 by a guide member 65, which is assembled on sleeve 51 and held in place against a retaining ring 67 under the force of a reset spring 69. In the reset position of plunger 49, as shown in FIG. 2, guide member 65 engages a stop provided by a retaining ring 71 in body 3 adjacent the open end of bore 63 to limit upward movement of the plunger by spring 69. The outer periphery 73 of guide member 65 is spherical in shape such that engagement of the outer periphery of guide member 65 with bore 63 accommodates the above-mentioned pivotal support of plunger 49 for a purpose hereinafter explained.

A latching mechanism 66 is provided between plunger 49 and body 3 to provide a means of presetting the plunger in a lock-out position. The latching mechanism 66 includes an outturned flange 73 of end plug 53 that overlaps an inturned lip 75 in bore 63 that projects into the path of travel of plunger 49. The underside 77 of flange 73 is chamfered, as is the upper surface 79 of lip 75, while the underside of lip 75 is formed by an undercut surface 81 that lies in a plane generally normal to the axis of bore 63. This lip 75 is crescent-shaped so as to extend only over a circumferential portion of bore 63, the maximum dimension of crescent-shaped lip 75 being generally in line with and on the side of bore 63 corresponding to the direction of movement of actuator rod 27 during extension thereof. In addition, the maximum diameter of flange 77 is less than the minimum diameter of bore 63 at lip 75 thereof to accommodate passage of flange 77.

When it is desired to disable empty/load valve device 5, in order to perform certain brake tests requiring unmodulated brake pressure, for example, lock-out assembly is activated prior to brake cylinder pressure being supplied via empty/load valve device 5. Activating lock-out assembly 1 is accomplished by manually depressing plunger 49 against the force of reset spring 69 sufficiently to engage latching mechanism 66. Engagement of latching mechanism 66 occurs when outturned flange 73 overrides inturned lip 75 and latches with the undercut surface 81, as shown in FIG. 3. This overriding action is brought about by initial engagement of the chamfered surface 79 of lip 75 with the correspondingly chamfered surface 77 of flange 73, as plunger 49 is moved axially in a downward direction. In that lip 75 is crescent-shaped so as to extend circumferentially about only a portion of bore 63, plunger end plug 53 is deflected laterally out of the axial path of travel of plunger 49 sufficient to allow flange 73 to pass crescent-shaped lip 75. This lateral deflection of plunger 49 at end plug 53 is provided for by guide member 65 about which the plunger is pivotally supported in bore 63. In that depression of plunger 49 concurrently compresses reset spring 69, it will be appreciated that this spring exerts a centering force on plunger 49 so that when flange 73 is depressed sufficiently to override lip 75, axial alignment of plunger 49 is restored so that the upper surface of flange 73 becomes engaged with undercut surface 81 of lip 75 to latch and maintain plunger 49 in its latching position without any further manual effort.

In this latching position of plunger 49, lock pin 47 is retracted into end plug 53, by engagement of its projecting end with the outer periphery of actuator rod 27, it being understood that in the absence of brake cylinder pressure, empty/load valve device 5 is set in its release position by spring 43, such that annular recess 45 of actuator rod 27 is offset from lock pin 47. In this manner, the locking assembly is conditioned to disable empty/load valve device 5 when brake cylinder pressure is subsequently supplied thereto.

With the lock-out assembly plunger pre-set as explained, the brake test may be safely initiated, in consequence of which compressed air is supplied to the car brake cylinder via empty/load valve device 5. This brake cylinder pressure is effective in actuating chamber 41 of empty/load valve device 5, forcing actuator piston 37 and actuator rod 27 in a right-hand direction from their normal release position shown in FIG. 3. In response to this rightward movement of actuator rod 27, annular recess 45 is moved toward alignment with the locking pin 47, which is maintained in engagement with the periphery of actuating rod 27 by spring 61. When recess 45 is aligned with lock pin 47, the lock pin is forced by spring 61 into locking engagement therewith, as shown in FIG. 4. Consequently, the actuating piston force acting on actuator rod 27 is transferred to the body 3 of empty/load valve device 5 via the left-hand side of recess 45, lock pin 47, end plug 53 and the periphery of flange 73, thereby preventing further rightward movement of actuator rod 27. This position of actuator rod 27, as determined by the axial location of recess 45 relative to locking pin 47, occurs prior to actuator piston 37 pulling spool valve member 39, through lost-motion-connection 40, a distance sufficient to effect transition of empty/load valve device 5 from its normal load setting to empty setting, thus preserving the integrity of the brake cylinder pressure for test purposes, even on a car that is in an "empty" load condition.

Following completion of the brake test, as evidenced by release of brake cylinder pressure, compressed air effective in actuating chamber 41 is released, allowing spring 43 to urge actuator rod 27 and piston 37 in a left-hand direction. In that lip 75 is crescent-shaped, so as to extend into bore 63 around only a portion of the bore, and the dimension of lip 75 in the axial direction of movement of actuator rod 27 is greater than the corresponding dimension of flange 73, leftward movement of the actuator rod, through engagement of the right-hand side of recess 45 with lock pin 47, shifts end plug 53 leftwardly to allow flange 73 to slide out from under lip 75. Accordingly, plunger 49 is unlatched, allowing reset spring 69 to move plunger 49 through guide member 65 to its upper-most reset position in which guide member 65 is stopped against retaining ring 71. As plunger 49 moves upwardly toward its reset position, end plug 53 picks up lock pin 47 through engagement with retaining ring 59 to lift the lock pin 47 out of locking engagement with recess 45 in actuator rod 27. In this manner, plunger 49 is automatically reset from its latching position in response to movement of actuator rod 27 toward release position, thereby assuring retraction of lock pin 47 from actuator rod 27 without any initiative on the part of the operator/tester to enable the empty/load valve device following completion of the brake test.

While the foregoing explanation of the invention has been given in terms of a slope sheet sensing arrangement for achieving the appropriate setting of empty/load valve device 5, the invention is also applicable to other sensing arrangements, such as a sensing arm configuration for monitoring the spring distance between a railroad car body and truck as a means of setting an empty/load valve according to the car load condition. Moreover, application of the invention is not intended to be limited to empty/load valve related operation, but may be employed with other actuators, where it is desirable to temporarily disable the actuator operation.

I claim:

1. A lock-out assembly for limiting axial extension of an actuator rod from a retracted position thereof comprising:
   (a) a manually operable plunger having a reset position and a lock-out position, said plunger including a lock pin;
   (b) lost-motion means for connecting said lock pin to said plunger with relative axial movement therebetween;
   (c) a spring between said lock pin and said plunger, said lock pin projecting from one end of said plunger a predetermined distance when said relative axial movement therebetween is taken up;
   (d) detent means for latching said plunger in said lock-out position, the distance between the periphery of said actuator rod and said one end of said plunger in said lock-out position being less than said predetermined distance such that said spring is compressed to pre-set said lock pin under load for subsequent locking engagement with said actuator rod when said actuator rod is extended from said retracted position to a limit position to thereby restrict further extension of said actuator rod, said detent means being automatically disengaged in response to subsequent movement of said actuator rod toward rod toward said retracted position during said locking engagement of said lock pin with said stop means to unlatch said plunger; and
   (e) means for urging said plunger toward said reset position in which said one end of said plunger is displaced from said actuator rod a distance greater than said predetermined distance, whereby said lock pin through said plunger is withdrawn from said locking engagement with said actuator rod.

2. A lock-out assembly as recited in claim 1, wherein
   (a) said plunger further includes an outturned flange; and
   (b) said detent means comprises:
      (i) a bore in which said plunger is disposed for axial movement between said reset and lock-out positions and;
      (ii) an inturned lip in said bore projecting into the path of travel of said outturned flange in accordance with said axial movement of said plunger between said reset and lock-out positions thereof, said lip including an undercut surface that lies in a plane generally normal to the axis of said bore, said flange being engageable with said undercut surface of said lip in said lock-out position of said plunger.

3. A lock-out assembly as recited in claim 2, wherein said lip extends circumferentially about only a portion of said bore.

4. A lock-out assembly as recited in claim 3, wherein said circumferential portion of said bore about which said lip extends is located on the side of said bore corresponding to the direction of said extension of said actuator rod from said retracted position toward said limit position.

5. A lock-out assembly as recited in claim 4, wherein said lip is crescent-shaped.

6. A lock-out assembly as recited in claim 5, wherein the greater dimension of said lip lies in line with the direction of said axial extension of said actuator rod.

7. A lock-out assembly as recited in claim 3, further characterized in that the maximum diameter of said flange is less than the minimum diameter of said bore at said lip thereof.

8. A lock-out assembly as recited in claim 7, wherein said inturned lip is formed with a tapered upper surface opposite said undercut surface and said flange is formed with a tapered under surface with which said tapered upper surface of said lip is engageable in response to said axial movement of said plunger from said reset position to said lock-out position to thereby effect lateral movement of said flange out of said path of travel thereof.

9. A lock-out assembly as recited in claim 8, wherein said plunger further includes guide means for providing pivotal movement of said plunger in said bore.

10. A lock-out assembly as recited in claim 9, wherein said plunger further includes:
 (a) a sleeve member;
 (b) an end plug fixed in one end of said sleeve member defining said one end of said plunger, said end plug being formed with said outturned flange, the diameter of said flange being greater than the diameter of said sleeve member; and
 (c) a bore in said end plug in which said lock pin is carried.

11. A lock-out assembly as recited in claim 10, wherein said guide means comprises a pivot member carried on said sleeve member, said pivot member having a spherical surface in contact with said bore during said axial movement of said plunger between said reset and lock-out positions.

12. A lock-out assembly as recited in claim 11, wherein said lost-motion connecting means comprises;
 (a) said end plug;
 (b) said lock pin; and
 (c) a first retaining ring on said lock pin in surrounding relationship with said bore, said retaining ring being spaced from said projecting end of said lock pin such distance that upon engagement of said retaining ring with said end plug said projecting end of said lock pin projects from said bore said predetermined distance; and
 (d) said distance between said projecting end of said lock pin and the periphery of said actuator rod in said lock-out position of said plunger being less than said predetermined distance, whereby said retaining ring is spaced-apart from said end plug.

13. A lock-out assembly as recited in claim 12, wherein said means for urging said lock pin to project from said one end of said plunger is a spring disposed between said sleeve member and said retaining pin.

14. A lock-out assembly as recited in claim 11, further comprising:
 (a) a first retaining ring on said sleeve member; and
 (b) said means for urging said plunger toward said reset position being a spring acting on said pivot member in the direction of said first retaining ring.

15. A lock-out assembly as recited in claim 14, further comprising a second retaining ring in said bore, said pivot member being engageable with said second retaining ring in response to movement of said plunger from said lock-out position to said reset position.

16. A lock-out assembly as recited in claim 1, wherein said actuator rod includes stop means with which said lock pin is engageable to provide said locking engagement therebetween.

17. A lock-out assembly as recited in claim 16, wherein said stop means is a recess in said actuator rod.

18. A lock-out assembly as recited in claim 17, wherein said recess in said actuator rod is an annular groove having a width at least as great as the diameter of said lock pin.

* * * * *